H. G. ROGERS.
COMBINED SNOW SHOVEL AND SCRAPER
APPLICATION FILED FEB. 13, 1919.

1,319,306.

Patented Oct. 21, 1919.

Inventor
H. G. Rogers
By his Attorneys
Baldwin Wight

Witness

UNITED STATES PATENT OFFICE.

HARRY G. ROGERS, OF BELMONT, NEW YORK.

COMBINED SNOW-SHOVEL AND SCRAPER.

1,319,306.  Specification of Letters Patent.  Patented Oct. 21, 1919.

Application filed February 13, 1919. Serial No. 276,780.

*To all whom it may concern:*

Be it known that I, HARRY G. ROGERS, a citizen of the United States, residing in Belmont, in the county of Allegany and State of New York, have invented a new and Improved Combined Snow-Shovel and Scraper, of which the following is a specification.

The object of the invention is to provide a new and improved tool, combining a snow shovel and scraper or chopper, and arranged so as to be conveniently and quickly changed from a snow shovel to a scraper or vice versa. A further object of the invention is to provide a shovel attachment to a scraper or chopper which may be readily detached therefrom.

My invention is a scraper or chopper having a shovel blade pivotally attached to it, which is capable of being swung about its pivot into operative and inoperative positions, and means for locking the shovel blade in those positions.

In the accompanying drawings:—

Figure 1:
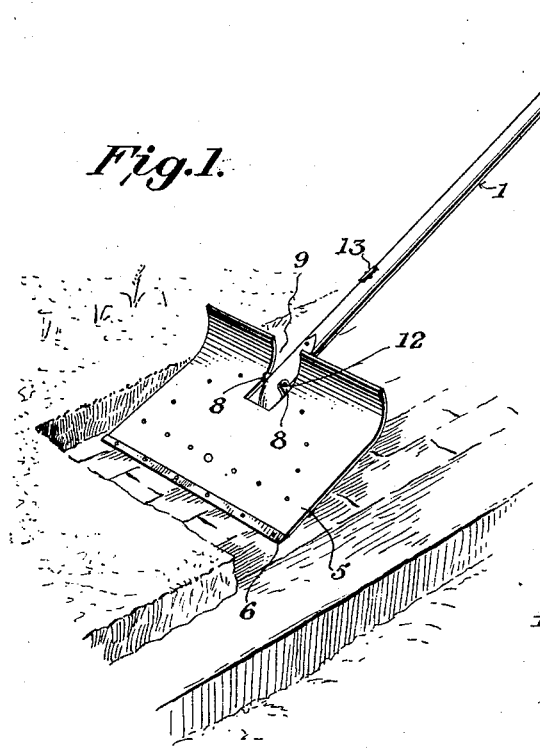
Figure 1 is a perspective view of the tool with the shovel blade in an operative position.
Figure 2:
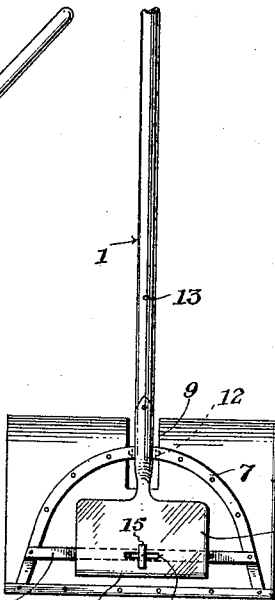
Fig. 2 is a rear elevation thereof.
Figure 3:
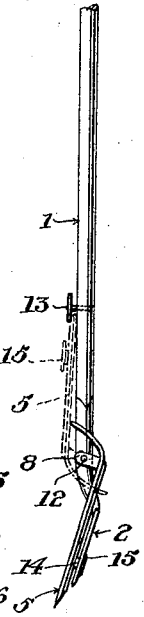
Fig. 3 is a side elevation, showing in dotted lines the shovel blade held in its inoperative position.
Figure 4:
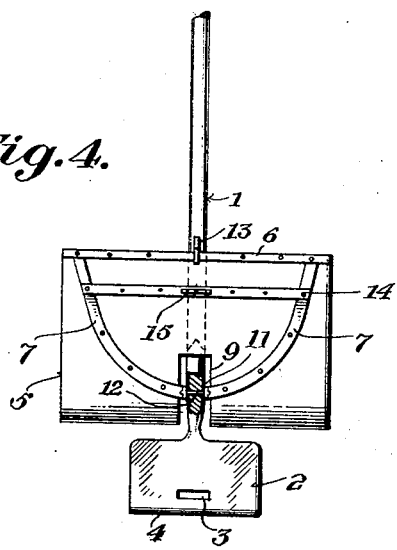
Fig. 4 is a front elevation of the tool with the shovel blade swung up into its inoperative position, and the handle shown partially in section.
Figure 5:
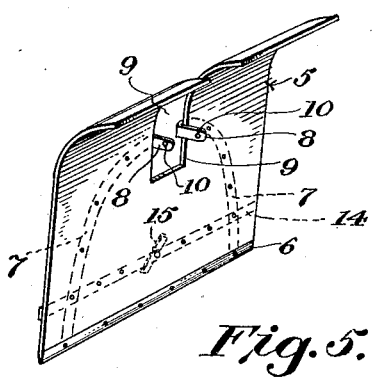
Fig. 5 is a perspective view of the shovel blade detached from the scraper.

The handle 1 has affixed to it at one end a scraper or chopper blade 2, which is provided with a transverse slot 3, parallel with the cutting edge 4 of the scraper or chopper. The handle and scraper blade will hereafter be called the scraper.

The shovel blade 5 has a reinforced edge 6 to which are connected bracing strips 7—7, terminating in the lugs 8—8 which extend substantially perpendicular to the shovel blade through the recess 9 thereof. The lugs are provided with openings 10, and the handle has an opening 11, and the shovel blade is pivotally connected to the scraper by the pin 12 passing through the openings.

A catch 13, preferably a turn button, is affixed to the front of the handle in a position to engage the edge of the shovel blade when the latter is swung into an inoperative position against the handle.

An additional bracing strip 14 on the back of the shovel blade supports a turn button 15, adapted to pass through the slot and engage the face of the scraper or chopper blade in order to lock the shovel blade in its operative position.

It will be apparent that the scraper may be used alone by swinging the shovel blade up to its inoperative position, or it may be released therefrom and used as a shovel. When so used, it will be seen that the scraper blade will act as a reinforcement and brace for the shovel blade.

Although I prefer to use my invention as a part of an ice scraper or chopper, as shown, yet I may use the shovel blade as an attachment to any type of scraper.

I claim as my invention:

1. The combination with a scraper having a blade, of a shovel blade pivotally mounted thereon, and means coöperating with the scraper blade for holding the said shovel blade in an operable position.

2. The combination with a scraper having a slot therein, of a shovel blade pivotally mounted thereon, and means on the shovel blade adapted to coöperate with said slot for holding the shovel blade in an operative position.

3. The combination with a scraper blade and handle, of a shovel blade pivotally mounted thereon, and means on said handle adapted to engage the tip of said shovel blade for holding said shovel blade in an inoperative position.

In testimony whereof, I have hereunto subscribed my name.

HARRY G. ROGERS.

Copies of this patent may be obtained for five cents each, by addressing the "Commissioner of Patents, Washington, D. C."